United States Patent
Seok et al.

(10) Patent No.: US 12,480,561 B2
(45) Date of Patent: Nov. 25, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventors: Donghee Seok, Seoul (KR); DuckYoung Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 413 days.

(21) Appl. No.: 18/216,125

(22) Filed: Jun. 29, 2023

(65) Prior Publication Data

US 2024/0125373 A1    Apr. 18, 2024

(30) Foreign Application Priority Data

Oct. 18, 2022  (KR) .................. 10-2022-0134178

(51) Int. Cl.
| | |
|---|---|
| *F16F 15/02* | (2006.01) |
| *B60P 7/16* | (2006.01) |
| *B65G 1/02* | (2006.01) |
| *F16F 15/00* | (2006.01) |
| *G01G 19/08* | (2006.01) |

(52) U.S. Cl.
CPC .............. *F16F 15/021* (2013.01); *B60P 7/16* (2013.01); *B65G 1/02* (2013.01); *F16F 15/002* (2013.01); *F16F 2230/0011* (2013.01); *F16F 2230/0047* (2013.01); *F16F 2230/18* (2013.01); *G01G 19/08* (2013.01)

(58) Field of Classification Search
CPC ............... F16F 15/021; F16F 15/002; F16F 2230/0011; F16F 2230/0047; F16F 2230/18; B60P 7/16; B60P 3/007; B60P 1/52; B60P 1/54; B65G 1/02; B65G 2203/042; B65G 13/10; G01G 19/08; B60R 16/023; B60W 40/076; B60W 2552/15; B60Y 2400/30
See application file for complete search history.

(56) References Cited

U.S. PATENT DOCUMENTS

| | | | |
|---|---|---|---|
| 12,008,507 B2 * | 6/2024 | Hong | ........................ B60P 1/52 |
| 2020/0354171 A1 | 11/2020 | Vincent | |
| 2022/0105853 A1 | 4/2022 | Lee et al. | |

FOREIGN PATENT DOCUMENTS

| | | |
|---|---|---|
| CN | 112406672 A | 2/2021 |
| GB | 2586481 B | 10/2021 |
| JP | 2019-112226 A | 7/2019 |
| KR | 20-0273148 Y1 | 4/2002 |
| KR | 20-0404243 Y1 | 12/2005 |

(Continued)

*Primary Examiner* — Wade Miles
*Assistant Examiner* — Jaewook Jung
(74) *Attorney, Agent, or Firm* — MCDONNELL BOEHNEN HULBERT & BERGHOFF LLP

(57) ABSTRACT

A vehicle includes a conveyor device in which a plurality of rotating bodies whose rotation directions, torques, and angles are controlled is arranged to form a plane and provided such that a freight is loaded on the plurality of rotating bodies, and a controller configured to control the rotation directions, torques, and angles of the plurality of rotating bodies to suppress shaking or movement of the freight loaded on the conveyor device.

18 Claims, 9 Drawing Sheets

(56) References Cited

FOREIGN PATENT DOCUMENTS

| KR | 2016-0081009 A | 7/2016 |
| KR | 10-2208006 B1 | 1/2021 |
| KR | 2022-0045637 A | 4/2022 |

\* cited by examiner

VEHICLE AND CONTROL METHOD THEREOF

CROSS REFERENCE TO RELATED APPLICATIONS

This application is based on and claims priority under 35 U.S.C. § 119 to Korean Patent Application No. 10-2022-0134178, filed on Oct. 18, 2022, in the Korean Intellectual Property Office, the disclosure of which is incorporated by reference herein in its entirety.

BACKGROUND

1. Field

The disclosure relates to a vehicle, and more particularly to freight transportation using a vehicle.

2. Description of the Related Art

Vehicles of various specifications for transporting freights, especially mobility devices for logistics, are being utilized. In the utilization of a mobility device for logistics, not only the efficiency of logistics but also the safety of freights is very important. During the movement of the mobility device for logistics, the freights loaded in a loading box may be damaged by shaking or impact caused by movement. For example, in situations such as rapid deceleration or rapid acceleration of the mobility device for logistics, a sharp curve, driving on an incline, and parking on an incline, the freights inside the loading box may be shaken or moved due to inertia or gravity. Due to this, difficulties in fixing the freights to prevent shaking or moving of the freights may occur.

SUMMARY

It is an aspect of the disclosure to provide a mobility device for logistics capable of preventing shaking/moving of freights through control of a conveyor device depending on a driving environment of the mobility device by installing the conveyor device in a loading box, and a control method thereof.

Additional aspects of the disclosure will be set forth in part in the description which follows and, in part, will be obvious from the description, or may be learned by practice of the disclosure.

In accordance with an aspect of the disclosure, a vehicle includes a conveyor device in which a plurality of rotating bodies whose rotation directions, torques, and angles are controlled is arranged to form a plane and provided such that a freight is loaded on the plurality of rotating bodies, and a controller configured to control the rotation directions, torques, and angles of the plurality of rotating bodies to suppress shaking or movement of the freight loaded on the conveyor device.

The rotating body may include a load sensor provided to measure a weight of the freight, and a communication device provided to communicate with the controller.

The controller may control the rotation directions of the plurality of rotating bodies in a direction opposite to a shaking direction or moving direction of the freight in order to suppress the shaking or movement of the freight.

The controller may control the torque of the rotating body to correspond to a weight of the freight in order to suppress the shaking or movement of the freight.

The controller may control the angle of the rotating body based on the shaking direction or moving direction of the freight in order to suppress the shaking or movement of the freight.

The controller may predict the shaking or movement of the freight from changes in locations of the plurality of rotating bodies to which a load of the freight is applied.

The controller may predict the shaking or movement of the freight from rapid maneuvering of the vehicle of a preset degree or more.

The rapid maneuvering of the vehicle of the preset degree or more may include at least one of rapid deceleration, rapid acceleration, and a sharp curve of preset degrees or more.

The controller may predict the shaking or movement of the freight when an inclination of a road where the vehicle is located is greater than or equal to a preset inclination.

The controller may compare a previous location and a current location of the freight after control for suppressing the shaking or movement of the freight, and control the rotation directions, torques, and angles of the plurality of rotating bodies so that the freight moves to the previous location when the previous location and the current location of the freight do not match.

The controller may generate a relatively larger reverse torque to a plurality of the rotating bodies located in the front in the shaking direction or moving direction of the freight among the plurality of rotating bodies supporting the freight, and generate a relatively smaller reverse torque to a plurality of the rotating bodies located in a central portion of the freight.

The controller may generate a reverse torque having a magnitude for suppressing shaking or movement of both of a first freight and a second freight to a plurality of the rotating bodies supporting the first freight when the first freight and the second freight are loaded side by side in a state of being adjacent to each other, and cause the second freight to be supported by the first freight.

In accordance with an aspect of the disclosure, a control method of a vehicle, which includes a conveyor device in which a plurality of rotating bodies whose rotation directions, torques, and angles are controlled is arranged to form a plane and provided such that a freight is loaded on the plurality of rotating bodies, includes detecting or predicting occurrence of shaking or movement of the freight mounted on the conveyor device, and controlling the rotation directions, torques, and angles of the plurality of rotating bodies to suppress the shaking or movement of the freight.

The rotating body may include a load sensor provided to measure a weight of the freight, and a communication device provided to communicate with the controller.

The control method may further include controlling the rotation directions of the plurality of rotating bodies in a direction opposite to a shaking direction or moving direction of the freight in order to suppress the shaking or movement of the freight.

The control method may further include controlling the torque of the rotating body to correspond to a weight of the freight in order to suppress the shaking or movement of the freight.

The control method may further include controlling the angle of the rotating body based on the shaking direction or moving direction of the freight in order to suppress the shaking or movement of the freight.

The control method may further include detecting the shaking or movement of the freight from changes in locations of the plurality of rotating bodies to which a load of the freight is applied.

The control method may further include predicting the shaking or movement of the freight from rapid maneuvering of the vehicle of a preset degree or more.

The maneuvering of the vehicle of the preset degree or more may include at least one of rapid deceleration, rapid acceleration, and a sharp curve of preset degrees or more.

The control method may further include predicting the shaking or movement of the freight when an inclination of a road where the vehicle is located is greater than or equal to a preset inclination.

The control method may further include comparing a previous location and a current location of the freight after control for suppressing the shaking or movement of the freight, and controlling the rotation directions, torques, and angles of the plurality of rotating bodies so that the freight moves to the previous location when the previous location and the current location of the freight do not match.

The control method may further include generating a relatively larger reverse torque to a plurality of the rotating bodies located in the front in the shaking direction or moving direction of the freight among the plurality of rotating bodies supporting the freight, and generating a relatively smaller reverse torque to a plurality of the rotating bodies located in a central portion of the freight.

The control method may further include generating a reverse torque having a magnitude for suppressing shaking or movement of both of a first freight and a second freight to a plurality of the rotating bodies supporting the first freight when the first freight and the second freight are loaded side by side in a state of being adjacent to each other, and causing the second freight to be supported by the first freight.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Figure 1:
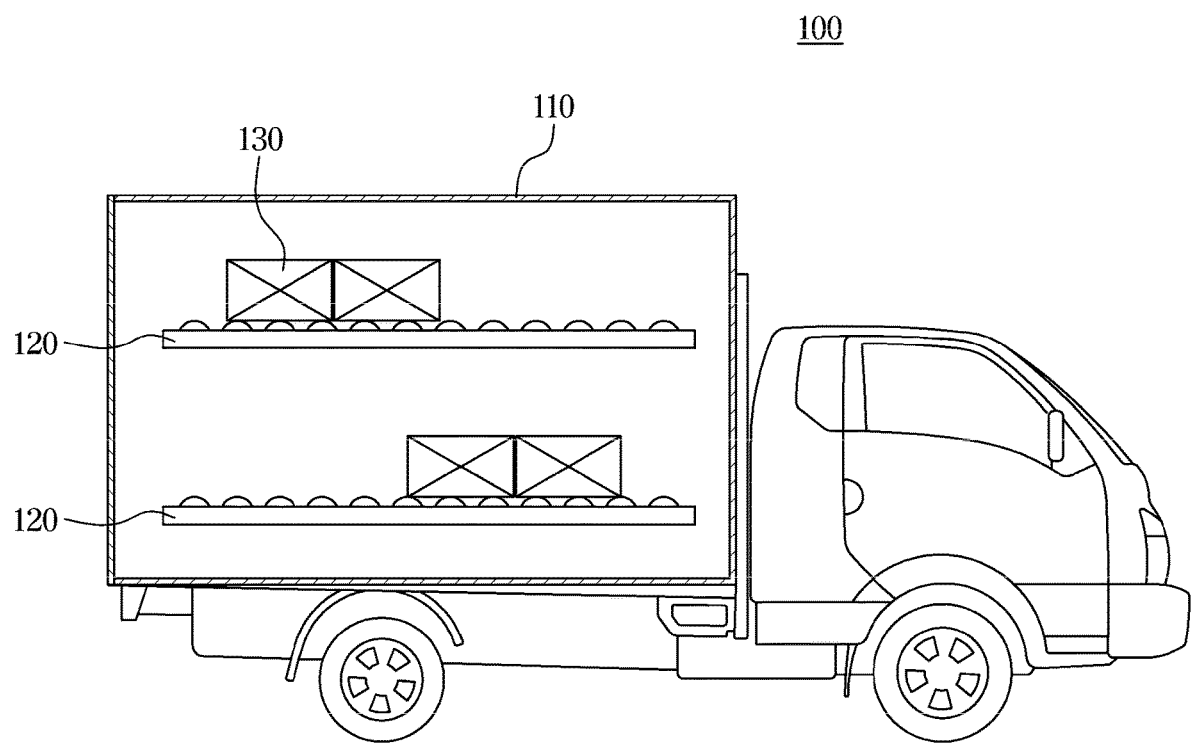
FIG. 1 is a view illustrating a mobility device for logistics according to an embodiment of the disclosure.

Throughout the specification, like reference numerals refer to like elements. This specification does not describe all factors of embodiments, and duplicative contents between general contents or embodiments in the technical field of the disclosure will be omitted. The terms 'member,' 'unit,' 'module,' and 'device' used in this specification may be embodied as software or hardware, and it is also possible for a plurality of 'members,' 'units,' and 'devices' to be embodied as one component, or one 'member,' 'unit,' 'module,' and 'device' to include a plurality of components according to the embodiments.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

Throughout the specification, when an element is referred to as being located "on" or "over" another element, this includes not only a case in which an element is in contact with another element but also a case in which another element exists between the two elements.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, an operation principle and embodiments of the disclosure will be described with reference to the accompanying drawings.

A user terminal (e.g., a portable package control panel) may be implemented as a computer or portable terminal capable of accessing a mobility device for logistics through a network.

Herein, the computer may include, for example, a notebook, a desktop, a laptop, a tablet PC, a slate PC, and the like, on which a WEB Browser is installed, and the portable terminal, which is a wireless communication device that ensures portability and mobility, may include all kinds of handheld based wireless communication devices, for example, such as a PCS (personal communication system), a GSM (global system for mobile communications), a PDC (personal digital cellular), a PHS (personal handyphone system), a PDA (personal digital assistant), an IMT (international mobile telecommunication)-2000, a CDMA (code division multiple access)-2000, an W-CDMA (W-code division multiple access), an WiBro (wireless broadband internet) terminal, and a smart phone, and a wearable device such as a watch, a ring, a bracelet, an anklet, a necklace, a pair of glasses, a contact lens, and a head-mounted-device (HMD).

FIG. 1 is a view illustrating a mobility device for logistics according to an embodiment of the disclosure.

As illustrated in FIG. 1, a mobility device for logistics 100 according to an embodiment of the disclosure includes a loading box 110. A conveyor device 120 is installed inside the loading box 110. The at least one conveyor device 120 may be installed in the loading box 110, and a plurality of the conveyor devices 120 may be installed to form layers in order to load more freights 130 in the loading box 110. Within the loading box 110, the freights 130 may be loaded for each of the conveyor devices 120.

Figure 2:
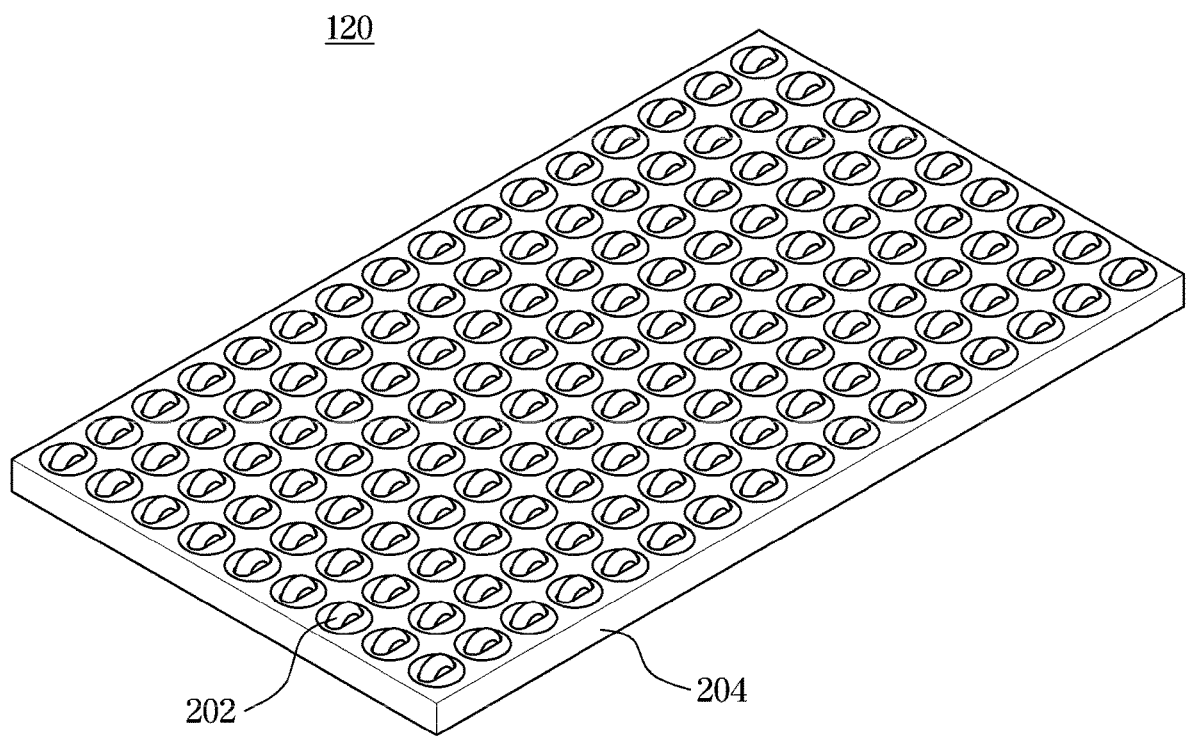
FIG. 2 is a view illustrating a conveyor device illustrated in FIG. 1.

FIG. 2 is a view illustrating a conveyor device illustrated in FIG. 1.

As illustrated in FIG. 2, the conveyor device 120 is installed such that a plurality of wheels 202 forms a grid arrangement on a frame 204 having a plate shape. Each of the plurality of wheels 202 is installed to be rotatable. Rotation of each of the plurality of wheels 202 will be described in detail with reference to FIGS. 3 and 4, which will be described later.

Figure 3:
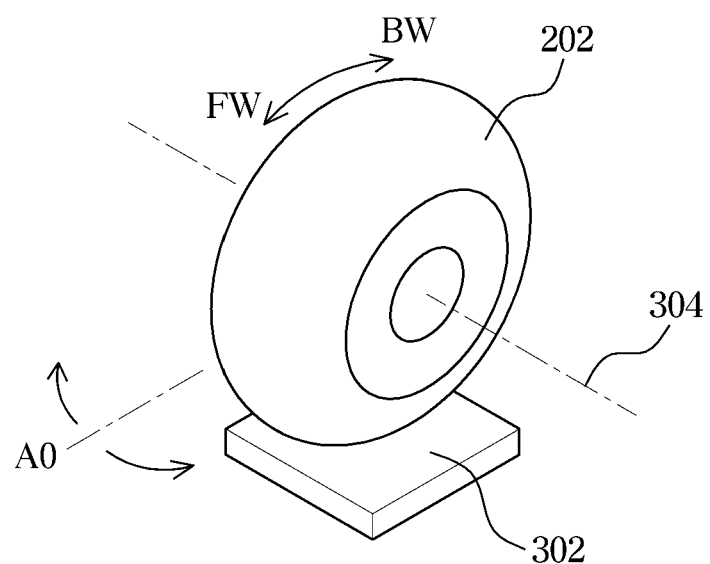
FIG. 3 is a view illustrating a structure of a wheel of the conveyor device illustrated in FIG. 2.

FIG. 3 is a view illustrating a structure of a wheel of the conveyor device illustrated in FIG. 2.

As illustrated in FIG. 3, each of the plurality of wheels 202 of the conveyor device 120 may rotate along an axis of rotation 304. The rotation of the wheel 202 may be forward rotation (FW) and reverse rotation (BW). A rotation direction of the wheel 202 of the conveyor device 120 may be formed through a motor (not shown). Torque when the wheel 202 rotates may be controlled through torque control of the motor (not shown). Therefore, the torque of the wheel 202 may be adjusted to increase or decrease as needed.

An angle of each of the plurality of wheels 202 of the conveyor device 120 may be controlled. The angle of the wheel 202 may be controlled to the left and right within a predetermined range with respect to a reference direction AO. The angle of the wheel 202 of the conveyor device 120 may be formed through the motor (not shown).

The rotation direction and angle of the wheel 202 are controlled by a conveyor controller (520 in FIG. 5), which will be described later. Each of the plurality of wheels 202 includes a wheel sensor unit 302. A load sensor (not shown) and a communication device (not shown) are provided inside the wheel sensor unit 302. The load sensor is provided to measure a load (pressure) applied to the wheel 202. A weight of the freight 130 located on the wheel 202 may be measured through the load sensor. The load (pressure) measured by the load sensor is transmitted to the conveyor controller 520 through the communication device.

As each of the plurality of wheels 202 provided in the conveyor device 120 is installed to form the grid arrangement, unique coordinates (location information) are assigned to each of the wheels 202. Accordingly, a location of the corresponding wheel 202 in the conveyor device 120 may be identified through these coordinates. In addition, a location of the freight 130 placed on the corresponding wheel 202 may be identified through the location information of each of the plurality of wheels 202.

The plurality of wheels 202 of the conveyor device 120 is an example of a rotating body. In addition to the shape of the wheel 202, the wheel 202 may be replaced with another shape as long as it is a rotating body capable of controlling the rotation direction, torque, and angle, such as a sphere shape or a roller shape.

Figure 4:
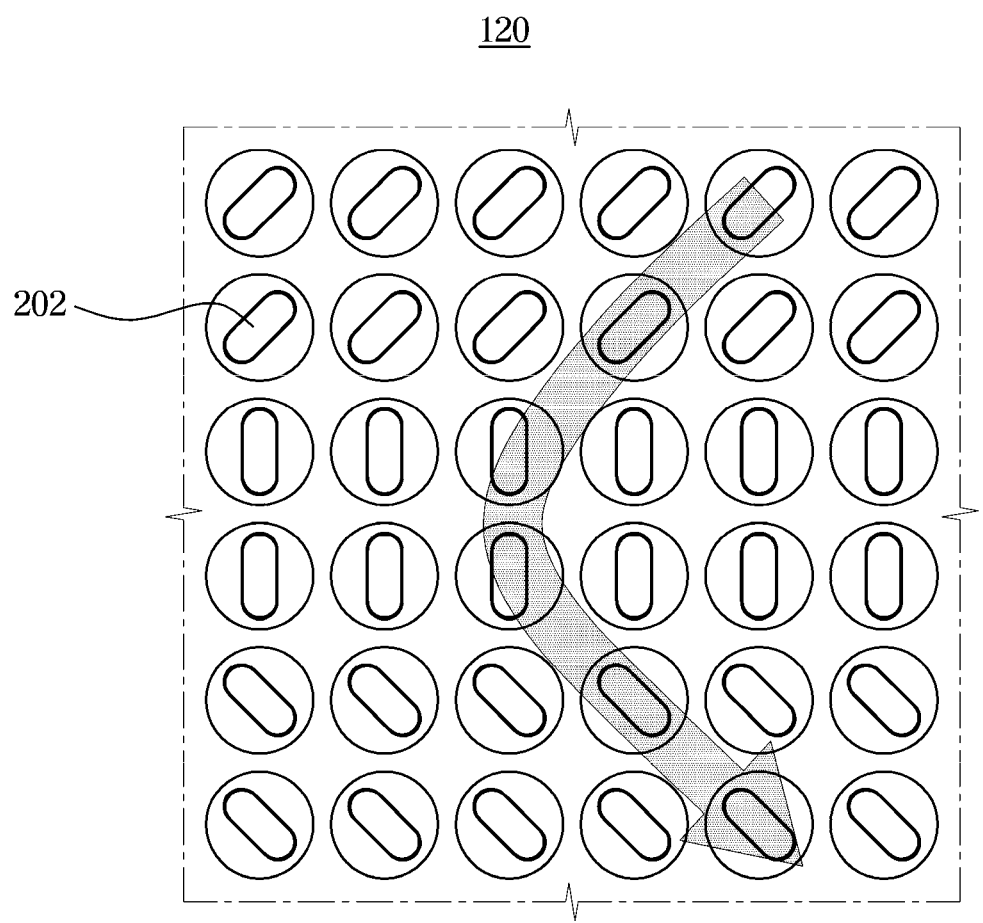
FIG. 4 is a view illustrating an independent direction conversion of the wheels of the conveyor device illustrated in FIG. 3.

FIG. 4 is a view illustrating an independent direction conversion of the wheels of the conveyor device illustrated in FIG. 3.

It has been mentioned above that the angle of each of the plurality of wheels 202 of the conveyor device 120 may be controlled in the description of FIG. 3. Through such angle control of each of the plurality of wheels 202, as indicated by an arrow in FIG. 4, a moving direction of a freight placed on the conveyor device 120 may be freely changed.

Figure 5:
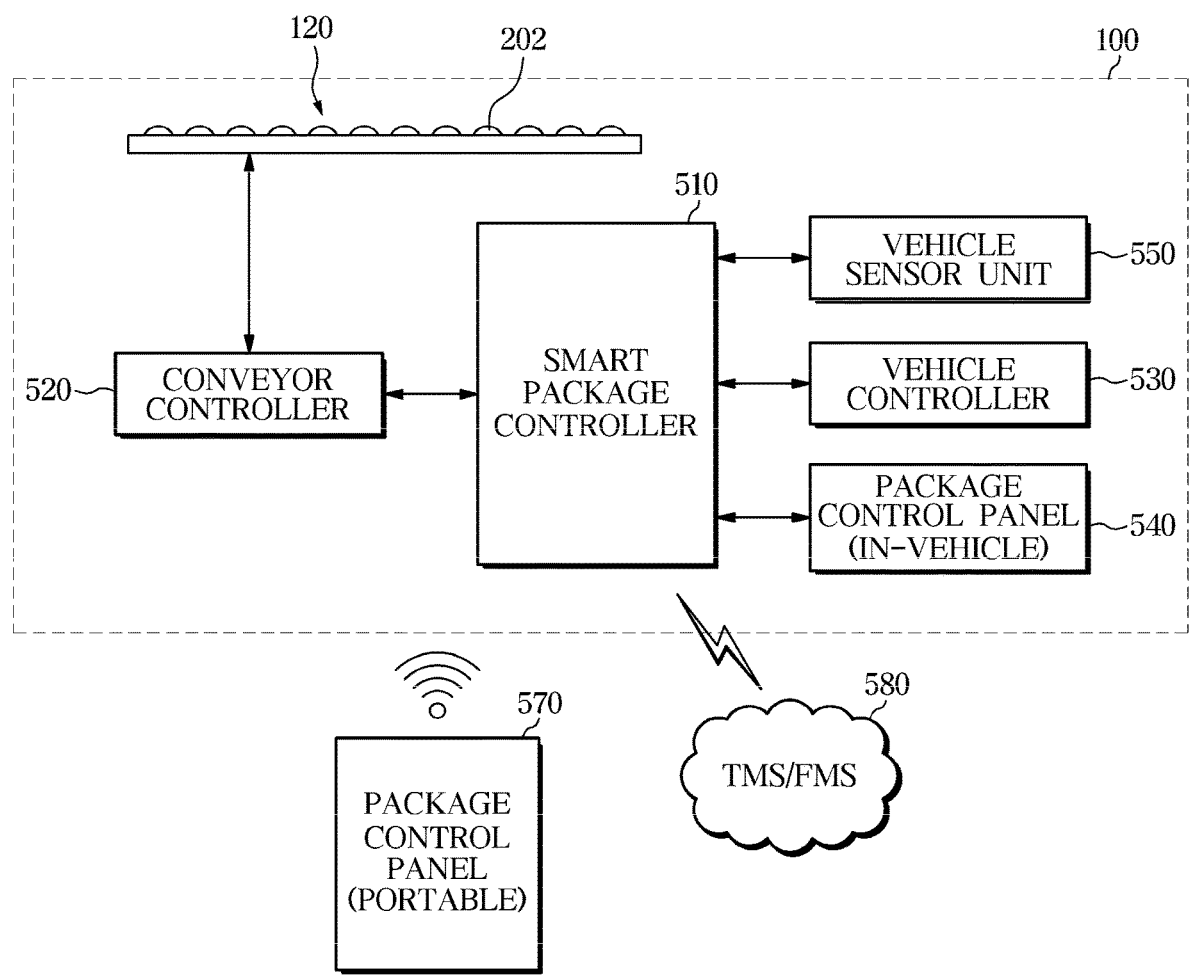
FIG. 5 is a diagram illustrating a control system of the mobility device for logistics according to an embodiment of the disclosure.

FIG. 5 is a diagram illustrating a control system of the mobility device for logistics according to an embodiment of the disclosure.

As illustrated in FIG. 5, through a smart package controller 510, the conveyor controller 520, the conveyor device 120, a vehicle controller 530, an in-vehicle package control panel 540, a vehicle sensor unit 550, and a portable package control panel 570 are connected to enable communication.

The smart package controller (SPC) 510, which is an upper controller of the conveyor controller 520, controls the rotation direction, torque, and angle of each of the plurality of wheels 202 of the conveyor device 120 through the conveyor controller 520. In order to control the rotation direction, torque, and angle of each of the plurality of wheels 202, the smart package controller 510 receives data or commands from the vehicle controller 530 and the package control panels 540 and 570, and receives detection values (data) from the vehicle sensor unit 550. The smart package controller 510 may have an IoT communication function for communication with the portable package control panel 570. In addition, the smart package controller 510 may be linked with a cloud service 580 to receive traffic information (traffic management system information) and facility-related information (facility management system information) from the cloud service 580. The smart package controller 510 may also exchange data in conjunction with other controllers of the mobility device for logistics 100.

The package control panels (PCP) 540 and 570 receive information related to freights loaded in the loading box 110 of the mobility device for logistics 100 from the smart package controller 510 and transmit the received information to the smart package controller 510. The information related to the loaded freights may be information such as loading locations, quantity, and loads of the freights. A control command related to a freight may be a command for moving the freight from a current location to another target location. To this end, the package control panels 540 and 570 may include a graphical user interface (GUI). The package control panels 540 and 570 may include the in-vehicle package control panel 540 and the portable package control panel 570. The in-vehicle package control panel 540 is provided in the form of an in-vehicle infotainment (IVI) in the boarding space of the mobility device for logistics 100, or may be provided in the form of a wall pad on a loading box door of the mobility device for logistics 100. The in-vehicle package control panel 540 communicates with the smart package controller 510 through an in-vehicle wired communication network. The portable package control panel 570 has the same function as the in-vehicle package control panel 540, but is not fixed to the mobility device for logistics 100 and thus may be carried by a user. The portable package control panel 570 may be provided in the form of an application installed on a mobile phone (also known as smart phone). The portable package control panel 570 may communicate with the smart package controller 510 through a wireless communication network.

The conveyor controller 520 communicates with the conveyor device 120 to obtain state information of each of the plurality of wheels 202 of the conveyor device 120, and transfers the obtained state information of each of the plurality of wheels 202 to the smart package controller 510. The state information of each of the plurality of wheels 202 of the conveyor device 120 obtained by the conveyor controller 520 may include the location information (coordinates), rotation direction, rotation torque, and angle of each of the plurality of wheels 202. The smart package controller 510 transmits a control signal for controlling the rotation direction, rotation torque, and angle of each of the plurality of wheels 202 of the conveyor device 120 to the conveyor controller 520, so that the conveyor controller 520 controls the rotation direction, rotation torque, and angle of each of the plurality of wheels 202 according to the received control signal.

The vehicle sensor unit 550 may include various sensors installed in the mobility device for logistics 100. For example, the vehicle sensor unit 550 may include a vehicle speed sensor (not shown) and a gyro sensor (not shown). The vehicle speed sensor may measure a speed of the mobility device for logistics 100. The gyro sensor may measure rapid acceleration or rapid deceleration of the mobility device for logistics 100. The gyro sensor may also measure an inclination of the loading box 110 of the mobility device for logistics 100. The vehicle sensor unit 550 may also include a GPS receiver (not shown) installed in the mobility device for logistics 100. The smart package controller 510 may obtain location information of the mobility device for logistics 100 through the GPS receiver.

The cloud service 580 provides information related to a traffic management system (TMS)/facility management system (FMS) to the smart package controller 510 through wireless communication with the smart package controller 510 of the mobility device for logistics 100. The TMS/FMS-related information provided by the cloud service 580 may include road information such as an inclined section, an unpaved section, a construction section, and the like on a driving route linked to a current location of the mobility device for logistics 100, a set guide route, and the like.

The controller may be implemented as a memory (not shown) for storing an algorithm for controlling the operations of components in the mobility device for logistics or data for a program reproducing the algorithm and a processor (not shown) for performing the above-described operations using data stored in the memory. In this case, the memory and the processor may be implemented as separate chips or may be implemented as a single chip.

The communication device may include one or more components that enable communication with an external device, and may include, for example, at least one of a short-range communication module, a wired communication module, and a wireless communication module.

The short-range communication module may include various short-range communication modules that transmit and receive signals using a wireless communication network in a short distance such as a Bluetooth module, an infrared communication module, a radio frequency identification (RFID) communication module, a wireless local access network (WLAN) communication module, a near field communication (NFC) module, and a Zigbee communication module.

The wired communication module may include various cable communication modules such as a universal serial bus (USB), a high definition multimedia interface (HDMI), a digital visual interface (DVI), a recommended standard 232 (RS-232), a power line communication, and a plain old telephone service (POTS), as well as various wired communication modules such as a controller area network (CAN) communication module, a local area network (LAN) module, a wide area network (WAN) module, and a value added network (VAN) module.

The wireless communication module, in addition to a Wi-Fi module and a wireless broadband module, may include wireless communication modules that support various wireless communication methods such as a global system for mobile communication (GSM), a code division multiple access (CDMA), a wideband code division multiple access (WCDMA), a universal mobile telecommunication system (UMTS), a time division multiple access (TDMA), and Long Term Evolution (LTE).

The wireless communication module may include a wireless communication interface including an antenna and a transmitter for transmitting signals. The wireless communication module may further include a signal conversion module for modulating a digital control signal output from the controller through a wireless communication interface into an analog type wireless signal under the control of the controller.

The wireless communication module may include a wireless communication interface including an antenna and a receiver for receiving signals. The wireless communication module may further include a signal conversion module for demodulating an analog type wireless signal received through a wireless communication interface into a digital control signal.

A storage device may be implemented as at least one of a non-volatile memory device such as a cache, a read only memory (ROM), a programmable ROM (PROM), an erasable programmable ROM (EPROM), an electrically erasable programmable ROM (EEPROM), and a flash memory, a volatile memory device such as a random access memory (RAM), and a storage medium such as a hard disk drive (HDD) and a CD-ROM, but is limited thereto. The storage unit may be the memory implemented as a chip separate from the processor described above in relation to the controller, or may be implemented as a single chip with the processor.

A display device may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto.

An input device may include hardware devices such as various buttons or switches, pedals, keyboards, mice, trackballs, various levers, handles, and sticks, for user input.

The input device may also include a graphical user interface (GUI), i.e., a software device, such as a touch pad for user input. The touch pad may be implemented as a touch screen panel (TSP) to form a mutual layer structure with the display device.

When configured as the touch screen panel (TSP) forming a mutual layer structure with the touch pad, the display device may also be used as the input device.

At least one component may be added or deleted corresponding to the performance of the components of the mobility device for logistics illustrated in FIG. 5. It will be easily understood by those skilled in the art that the mutual positions of the components may be changed corresponding to the performance or structure of the system.

Each of the components illustrated in FIG. 5 means a software component and or a hardware component such as a field-programmable gate array (FPGA) and an application specific integrated circuit (ASIC).

Figure 6:
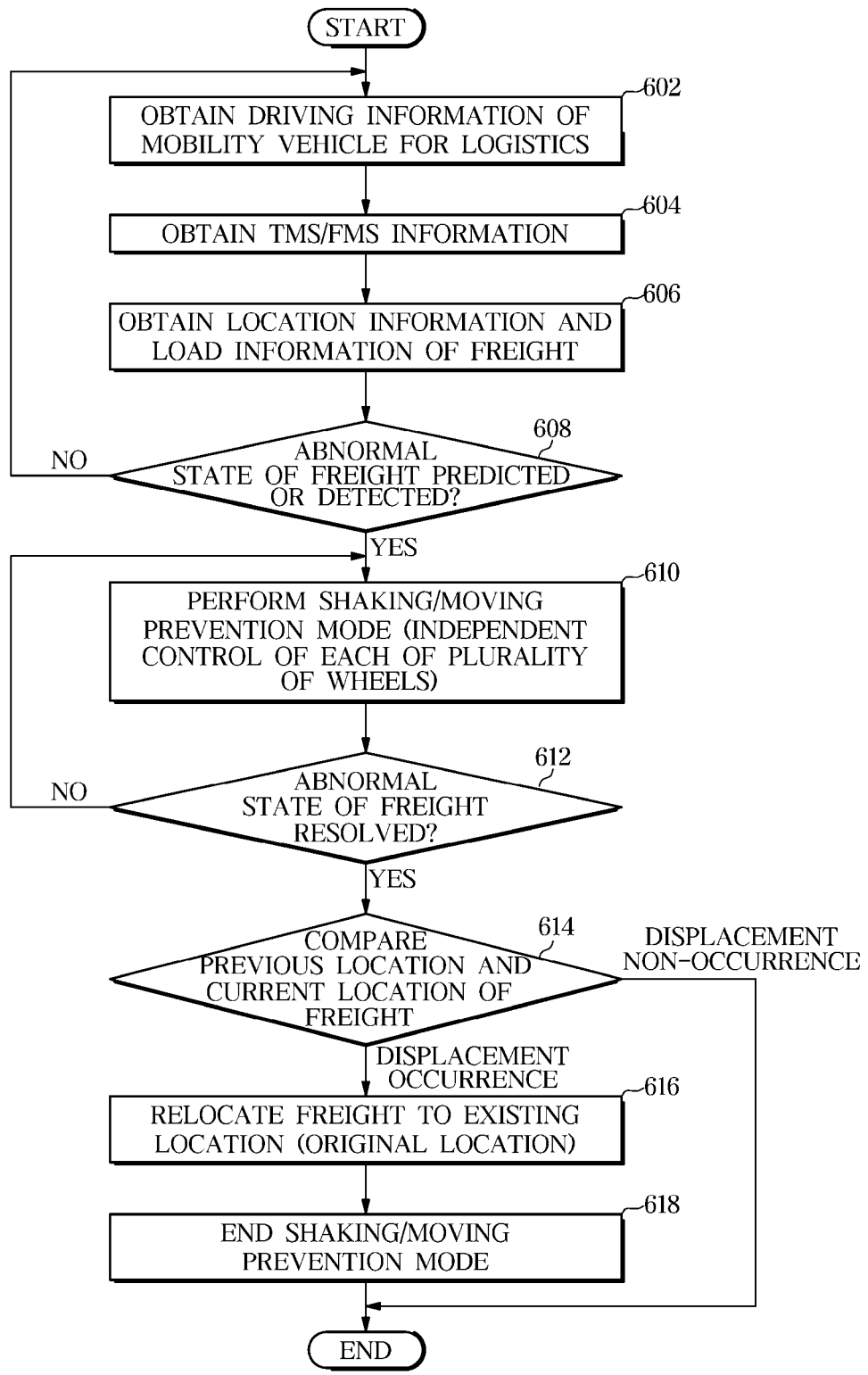
FIG. 6 is a flowchart illustrating a control method of the mobility device for logistics according to an embodiment of the disclosure.

FIG. 6 is a flowchart illustrating a control method of the mobility device for logistics according to an embodiment of the disclosure. A control method illustrated in FIG. 6 may is to suppress shaking or movement of the freight 130 or prevent the shaking or movement in advance by controlling the rotation direction, rotation torque, and angle of each of the plurality of wheels 202 of the conveyor device 120 when a situation such as the shaking or movement of the freight 130 loaded in the loading box 110 of the mobility device for logistics 100 occurs or is expected to occur.

The smart package controller (SPC) 510 of the mobility device for logistics 100 communicates with the vehicle controller 530 to obtain driving information of the mobility device for logistics 100 at 602. The driving information of the mobility device for logistics 100 may include information on deceleration and acceleration, lane change, and a gyro sensor value (i.e., inclination) of the mobility device for logistics 100. In the cases of deceleration, acceleration, and lane change, when degrees of deceleration, acceleration, and lane change that are expected to cause shaking or movement of the freight 130 loaded in the load box 110 are preset as reference values, cases in which actual degrees of deceleration, acceleration, and lane change of the mobility device for logistics 100 exceed the preset reference values may be determined as rapid deceleration, rapid acceleration, and rapid lane change, respectively. The degrees of deceleration, acceleration, and lane change that are expected to cause shaking or movement of the freight 130 loaded in the load box 110 of the mobility device for logistics 100 may be obtained in advance through experiments.

The smart package controller 510 communicates with the cloud service 580 to obtain TMS/FMS-related information from the cloud service 580 at 604. The TMS/FMS-related information that the smart package controller 510 obtains from the cloud service 580 may include road information such as an inclined section, an unpaved section, a construction section, and the like on a driving route linked to a current location of the mobility device for logistics 100, a set guide route, and the like.

The smart package controller 510 obtains location information and load information of the freight 130 loaded in the loading box 110 of the mobility device for logistics 100 at 606. The location information of the freight 130 is information on where the freight loaded in the loading box 110 is located within the loading box 110. The location information of the freight 130 may be identified through location information (coordinates) of the wheel 202 at which the freight 130 is located. The load information of the freight 130 is information on a load (weight) of the corresponding freight 130 for each location.

The smart package controller 510 may predict an abnormal state of the freight 130 currently loaded in the loading box 110 in advance or detect the abnormal state in real time, based on the above driving information, TMS/FMS information, location information of the freight 130, and load information of the freight 130 at 608. The abnormal state of the freight 130 may include shaking or moving the freight 130 without being fixed within the loading box 110. The 'detection' of the shaking or movement of the freight 130 may be to detect a displacement of the freight 130 caused by the shaking or movement of the freight 130 through the load sensors of the plurality of wheels 202. Because when the freight 130 is shaken or moved and a displacement occurs, locations of the plurality of wheels 202 to which the load of the freight 130 is applied also change, shaking or movement of the freight 130 may be detected from changes in locations of the plurality of wheels 202 to which the load of the freight 130 is applied. Because in situations such as rapid deceleration or rapid acceleration, a sharp curve, driving on an incline, and parking on an incline of the mobility device for logistics, the freights inside the loading box may be shaken or moved due to inertia or gravity, shaking or movement of the freight 130 from such situations may be 'predicted'.

The smart package controller 510 performs the freight shaking/moving prevention mode to prevent shaking or movement of the freight 130 at 610 when the abnormal state of the freight 130 is predicted or checked in real time (YES in 608).

Figure 7:
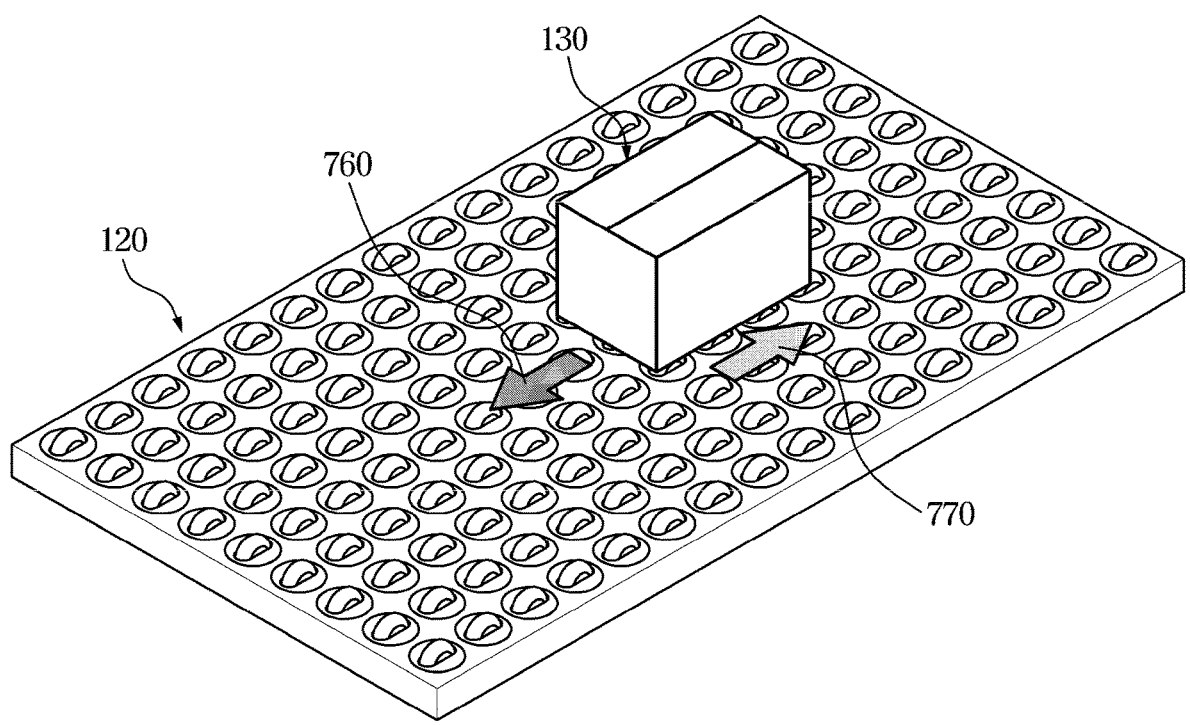
FIG. 7 is a view illustrating an example of controlling a plurality of the wheels in a freight shaking/moving prevention mode according to an embodiment of the disclosure.

FIG. 7 is a view illustrating an example of controlling a plurality of the wheels in the freight shaking/moving prevention mode according to an embodiment of the disclosure.

As illustrated in FIG. 7, in the freight shaking/moving prevention mode according to an embodiment of the disclosure, the smart package controller 510 detects a shaking direction or moving direction of the freight 130 and generates a torque in a direction opposite to the shaking direction or moving direction of the freight 130, thereby suppressing the shaking or movement of the freight 130. In FIG. 7, a direction of an arrow indicated by a reference numeral 760 indicates the shaking direction or moving direction of the freight 130, and a direction of an arrow indicated by a reference numeral 770 indicates a direction of a reverse torque generated by the plurality of wheels 202 to suppress the shaking or movement of the freight 130. In this case, a magnitude of the reverse torque 770 may be a magnitude capable of suppressing the shaking or movement of the freight 130 based on the load of the freight 130. When a road surface at a location where the mobility device for logistics 100 is parked or stopped is inclined, the freight 130 loaded in the loading box 110 of the mobility device for logistics 100 may also be inclined due to the slope of the road surface. In this case, by fixing the freight 130 through the freight shaking/moving prevention mode according to an embodiment of the disclosure, the freight 130 may be prevented from being moved by tilting.

Figure 8:
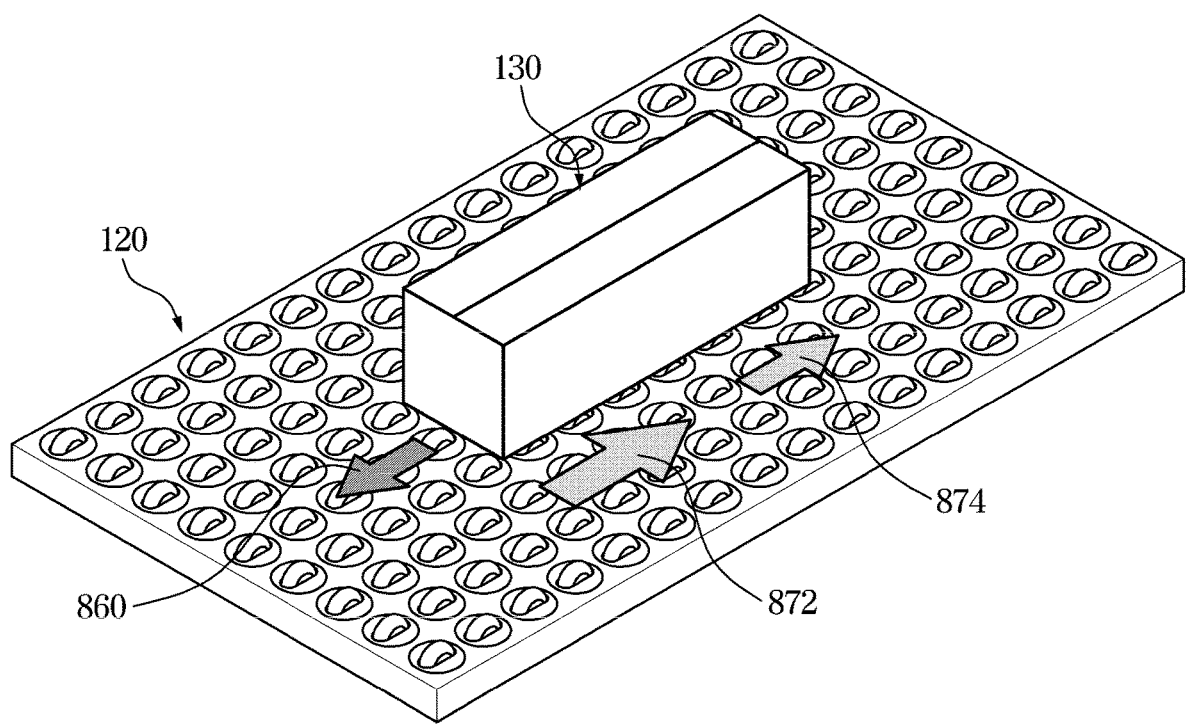
FIG. 8 is a view illustrating another example of controlling the plurality of wheels in the freight shaking/moving prevention mode according to an embodiment of the disclosure.

FIG. 8 is a view illustrating another example of controlling the plurality of wheels in the freight shaking/moving prevention mode according to an embodiment of the disclosure. As illustrated in FIG. 8, in the freight shaking/moving prevention mode according to another embodiment of the disclosure, the smart package controller 510 detects the shaking direction or moving direction of the freight 130 and generates a torque in a direction opposite to the shaking direction or moving direction of the freight 130, thereby suppressing the shaking or movement of the freight 130. However, in the case of FIG. 8, the smart package controller 510 generates a relatively larger reverse torque 872 to a plurality of the wheels 202 located at the very front in the shaking direction or moving direction of the freight 130 (a plurality of the wheels located on a front edge of the freight 130) among the plurality of wheels 202 supporting the freight 130, and generates a relatively smaller reverse torque 874 to a plurality of the wheels 202 located in a central portion of the freight 130, thereby suppressing the shaking or movement of the freight 130. In FIG. 8, an arrow indicated by the reference numeral 872 represents a relatively larger reverse torque generated by the plurality of wheels 202 located at the very front of the shaking direction or moving direction of the freight 130, and an arrow indicated by the reference numeral 874 represents a relatively smaller reverse torque generated in the plurality of wheels 202 located in the central portion of the freight 130.

Figure 9:
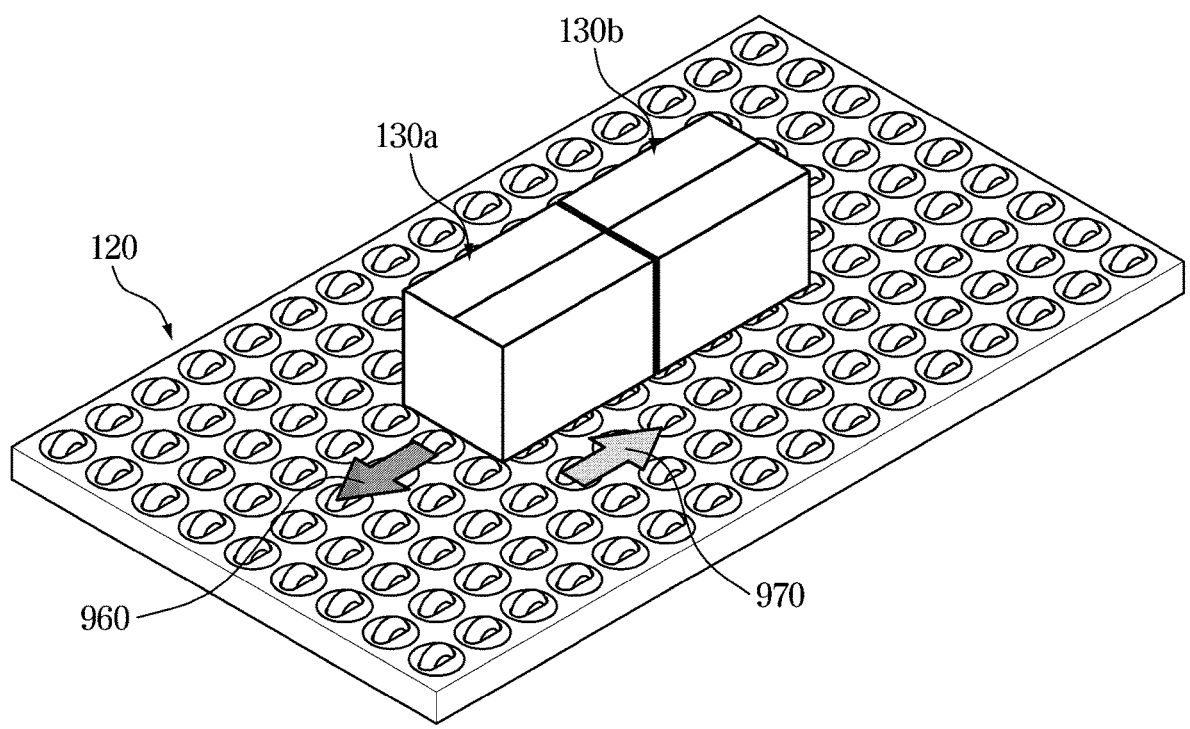
FIG. 9 is a view illustrating another example of controlling the plurality of wheels in the freight shaking/moving prevention mode according to an embodiment of the disclosure.

FIG. 9 is a view illustrating another example of controlling the plurality of wheels in the freight shaking/moving prevention mode according to an embodiment of the disclosure. As illustrated in FIG. 9, in the freight shaking/moving prevention mode according to another embodiment of the disclosure, the smart package controller 510 detects a shaking direction or moving direction of freights 130a and 130b and generates a torque in a direction opposite to the shaking direction or moving direction of the freights 130a and 130b, thereby suppressing the shaking or movement of the freights 130a and 130b. However, in the case of FIG. 9, when a plurality of the freights 130a and 130b is loaded side by side in a state of being adjacent to each other, the smart package controller 510 fixes the front freight 130a by generating a reverse torque 970, which has a magnitude sufficient to suppress the overall shaking or movement of the plurality of freights 130a and 130b, from a plurality of the wheels 202 supporting the front freight 130a located at the very front in the shaking direction or moving direction among the plurality of wheels 202 supporting the freights 130a and 130b, and causes the other rear freight 130b to rely on the front freight 130a fixed by the sufficiently large reverse torque 970. In FIG. 9, an arrow indicated by a reference numeral 960 indicates the shaking direction or moving direction of the freights 130a and 130b, and an arrow indicated by the reference numeral 970 represents a reverse torque generated by the plurality of wheels 202 on which the front freight 130a is located.

Referring back to FIG. 6, the smart package controller 510 checks whether the abnormal state (shaking or vibration) of the freight 130 is resolved through the execution of the freight shaking/moving prevention mode in step 610 at 612.

When the smart package controller 510 predicts and prepares for shaking or movement of the freight 130 in advance, shaking or movement of the freight 130 is suppressed in advance before the shaking or movement actually occurs, and thus a displacement of the freight 130 does not occur within the loading box 110. However, when the smart package controller 510 detects and prepares for shaking or movement of the freight 130 in real time, shaking or movement of the freight 130 is suppressed after the shaking or movement has already started, and thus there is some degree of possibility that a displacement of the freight 130 occurs within the loading box HO. Even after the abnormal state of the freight 130 is resolved (YES in 612), the smart package controller 510 checks whether a displacement of the freight 130 has occurred by comparing a previous location and a current location of the freight 130 in the loading box 110 at 614. When a displacement of freight 130 occurs ('displacement occurrence' in 614), the smart package controller 510 performs control for relocating the location of the freight 130 to an existing location (original location) at 616. In order to relocate the displaced freight 130 to the existing location (original location), the smart package controller 510 moves the freight 130 from the current location to the existing location (original location) by controlling the rotation directions, torques, and angles of the plurality of wheels 202 at which the freight 130 is currently located. To this end, the smart package controller 510 may utilize the location information (coordinates) of a plurality of the wheels 202 at the current location of the corresponding freight 130 and the location information (coordinates) of a plurality of the wheels 202 at the existing location (original location) of the freight 130.

Because it may be considered that some of the loaded freights 130 has fallen to the bottom of the loading box 110 when a loading range of the freights 130 is wider than an existing loading range, in this case, the smart package controller 510 may generate a warning to inform a driver of the fall of the freights 130 through a cluster, a display, or a speaker.

When the abnormal state of the freight 130 is resolved through the freight shaking/moving prevention mode according to an embodiment of the disclosure ('YES' in 612) and the location of the freight 130 is adjusted to the existing location (original location) at 616, the smart package controller 510 ends the freight shaking/moving prevention mode at 618.

As is apparent from the above, a mobility device for logistics and a control method thereof according to an embodiment of the disclosure can prevent shaking/moving of freight through control of a conveyor device depending on a driving environment of the mobility device by installing the conveyor device in a loading box.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

The invention claimed is:

1. A vehicle comprising:
   a conveyor device shaped as a plane and comprising a plurality of rotating bodies, wherein a freight is loaded on the plurality of rotating bodies; and
   a controller configured to control a rotation direction, a torque, and an angle of each of the plurality of rotating bodies to suppress shaking or movement of the freight loaded on the conveyor device,
   wherein the controller is configured to generate a reverse torque having a magnitude for suppressing shaking or movement of both a first freight and a second freight to a portion of the plurality of the rotating bodies supporting the first freight when the first freight and the second freight are loaded adjacent to each other, and to cause the second freight to be supported by the first freight.

2. The vehicle according to claim 1, wherein each of the plurality of rotating bodies comprises:
   a load sensor configured to measure a weight of the freight; and
   a communication device configured to communicate with the controller.

3. The vehicle according to claim 1, wherein the controller controls the rotation directions of each of the plurality of rotating bodies in a direction opposite to a shaking direction or moving direction of the freight in order to suppress the shaking or movement of the freight.

4. The vehicle according to claim 3, wherein the controller controls the torque of each of the plurality of rotating bodies to correspond to a weight of the freight in order to suppress the shaking or movement of the freight.

5. The vehicle according to claim 3, wherein the controller controls the angle of each of the plurality of rotating bodies based on the shaking direction or moving direction of the freight in order to suppress the shaking or movement of the freight.

6. The vehicle according to claim 1, wherein the controller predicts a shaking or a movement of the freight from at least one of:
   a change in location of each of the plurality of rotating bodies to which a load of the freight is applied,
   rapid maneuvering of the vehicle of a preset degree or more; or when an inclination of a road where the vehicle is located is greater than or equal to a preset inclination.

7. The vehicle according to claim 6, wherein when the controller predicts a shaking or a movement of the freight from rapid maneuvering of the vehicle of a preset degree or more, the rapid maneuvering of the vehicle of the preset degree or more comprises at least one of rapid deceleration, rapid acceleration, and a sharp curve of preset degrees or more.

8. The vehicle according to claim 1, wherein the controller is configured to compare a previous location and a current location of the freight after control for suppressing a shaking or a movement of the freight, and is configured to control the rotation direction, the torque, and the angle of each of the plurality of rotating bodies so that the freight moves to the previous location when the previous location and the current location of the freight do not match.

9. The vehicle according to claim 1, wherein the controller is configured to generate a larger reverse torque to a portion of the plurality of the rotating bodies located in a front of the freight, in a shaking direction or a moving direction of the freight, and to generate a smaller reverse torque to a portion of the plurality of the rotating bodies located in a central portion of the freight.

10. A control method of a vehicle comprising a conveyor device shaped as a plane and comprising a plurality of rotating bodies, wherein a freight is loaded on the plurality of rotating bodies, wherein the control method comprises:
    detecting or predicting occurrence of shaking or movement of the freight mounted on the conveyor device;
    controlling a rotation direction, a torque, and an angle of each of the plurality of rotating bodies to suppress the shaking or movement of the freight;
    generating a reverse torque having a magnitude for suppressing shaking or movement of both a first freight and a second freight to a portion of the plurality of the rotating bodies supporting the first freight when the first freight and the second freight are loaded adjacent to each other; and
    causing the second freight to be supported by the first freight.

11. The control method according to claim 10, wherein each of the plurality of rotating bodies comprises:
    a load sensor configured to measure a weight of the freight; and
    a communication device configured to communicate with the controller.

12. The control method according to claim 10, further comprising controlling the rotation directions of each of the plurality of rotating bodies in a direction opposite to a shaking direction or moving direction of the freight in order to suppress the shaking or movement of the freight.

13. The control method according to claim 12, further comprising controlling the torque of each of the plurality of rotating bodies to correspond to a weight of the freight in order to suppress the shaking or movement of the freight.

14. The control method according to claim 12, further comprising controlling the angle of each of the plurality of rotating bodies based on the shaking direction or moving direction of the freight in order to suppress the shaking or movement of the freight.

15. The control method according to claim 10, further comprising predicting the shaking or movement of the freight from at least one of:
    a change in location of each of the plurality of rotating bodies to which a load of the freight is applied;
    rapid maneuvering of the vehicle of a preset degree or more; or
    an inclination of a road where the vehicle is located is greater than or equal to a preset inclination.

16. The control method according to claim 15, wherein when predicting the shaking or movement of the freight from rapid maneuvering of the vehicle of a preset degree or more, the rapid maneuvering of the vehicle of the preset degree or more comprises at least one of rapid deceleration, rapid acceleration, and a sharp curve of preset degrees or more.

17. The control method according to claim 10, further comprising:
    comparing a previous location and a current location of the freight after control for suppressing the shaking or movement of the freight; and
    controlling the rotation directions, torques, and angles of the plurality of rotating bodies so that the freight moves to the previous location when the previous location and the current location of the freight do not match.

18. The control method according to claim 10, further comprising:
    generating a larger reverse torque to a portion of the plurality of the rotating bodies located in the front of the freight in a shaking direction or a moving direction of the freight; and
    generating a smaller reverse torque to a portion of the plurality of the rotating bodies located in a central portion of the freight.

* * * * *